US010678762B2

(12) United States Patent
Narayan et al.

(10) Patent No.: US 10,678,762 B2
(45) Date of Patent: Jun. 9, 2020

(54) ISOLATING DATA TO BE MOVED ACROSS BOUNDARIES

(71) Applicant: Microsoft Technology Licensing, LLC, Redmond, WA (US)

(72) Inventors: Shyam Narayan, Redmond, WA (US); Adrian Fanaru, Sammamish, WA (US); Burra Gopal, Bellevue, WA (US); James P. Rupke, Seattle, WA (US); Parul Manek, Redmond, WA (US); Ziyi Wang, Redmond, WA (US); David Charles Oliver, Bellevue, WA (US); Daniel Keith Winter, Monroe, WA (US); Yang Xiang, Issaquah, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 1219 days.

(21) Appl. No.: 14/874,137

(22) Filed: Oct. 2, 2015

(65) Prior Publication Data
US 2016/0321248 A1    Nov. 3, 2016

Related U.S. Application Data

(60) Provisional application No. 62/156,082, filed on May 1, 2015.

(51) Int. Cl.
*G06F 16/21* (2019.01)
*G06F 16/27* (2019.01)

(52) U.S. Cl.
CPC .......... *G06F 16/214* (2019.01); *G06F 16/27* (2019.01)

(58) Field of Classification Search
CPC .... G06F 9/45558; G06F 16/27; G06F 16/119; G06F 16/214; G06F 16/252; G06F 2009/4557; G06F 2009/45587; G06F 2009/45595
USPC .......... 707/600–831, 899, 999.001–999.206
See application file for complete search history.

(56) References Cited

U.S. PATENT DOCUMENTS

| 6,145,066 A | 11/2000 | Atkin |
| 6,195,701 B1 | 2/2001 | Kaiserswerth et al. |
| 6,393,434 B1 | 5/2002 | Huang et al. |
| 6,405,294 B1 | 6/2002 | Hayter |
| 7,281,014 B2 | 10/2007 | Toner |
| 7,401,033 B2 | 7/2008 | Al-Azzawe |
| 7,523,141 B2 | 4/2009 | Makismenka et al. |
| 7,669,208 B2 | 2/2010 | Wu et al. |

(Continued)

FOREIGN PATENT DOCUMENTS

| EP | 1462960 A2 | 9/2004 |
| EP | 1503313 A1 | 2/2005 |

(Continued)

OTHER PUBLICATIONS

"Notice of Allowance Issued in U.S. Appl. No. 14/874,181", dated Oct. 31, 2018, 11 Pages.

(Continued)

*Primary Examiner* — Angelica Ruiz
(74) *Attorney, Agent, or Firm* — Christopher J. Volkmann; Kelly, Holt & Christenson, PLLC

(57) ABSTRACT

Data to be moved from a source system to a target system, for a set of tenants, is first identified. It is then isolated into its own container. The contents are then moved.

18 Claims, 10 Drawing Sheets

(56) References Cited

U.S. PATENT DOCUMENTS

| | | | |
|---|---|---|---|
| 7,694,223 B2 | 4/2010 | Corson | |
| 7,792,794 B2 | 9/2010 | Mills et al. | |
| 7,890,454 B2 | 2/2011 | Hamilto et al. | |
| 8,046,552 B2 | 10/2011 | Larson | |
| 8,156,074 B1 | 4/2012 | Multer et al. | |
| 8,166,101 B2 | 4/2012 | Shah | |
| 8,261,033 B1 | 9/2012 | Slik et al. | |
| 8,271,891 B1 | 9/2012 | Osbourn et al. | |
| 8,352,425 B2 | 1/2013 | Bourbonnais et al. | |
| 8,386,501 B2 | 2/2013 | Cahill et al. | |
| 8,495,045 B2 | 7/2013 | Wolf et al. | |
| 8,584,124 B2* | 11/2013 | Fee | G06F 9/4843 718/101 |
| 8,694,895 B2 | 4/2014 | Sanchez et al. | |
| 8,805,783 B2 | 8/2014 | Muhunthan et al. | |
| 8,924,352 B1 | 12/2014 | Andruss et al. | |
| 8,935,190 B2 | 1/2015 | Amoroso et al. | |
| 8,996,675 B2 | 3/2015 | Kalyanaraman et al. | |
| 8,996,837 B1* | 3/2015 | Bono | G06F 3/0614 711/114 |
| 9,104,682 B2 | 8/2015 | Banerjee et al. | |
| 2004/0039962 A1 | 2/2004 | Ganesh et al. | |
| 2005/0027747 A1 | 2/2005 | Wu et al. | |
| 2005/0027817 A1 | 2/2005 | Novik et al. | |
| 2006/0086799 A1 | 4/2006 | Robertson et al. | |
| 2007/0094308 A1 | 4/2007 | Mitchell et al. | |
| 2007/0299631 A1 | 12/2007 | Macbeth et al. | |
| 2008/0091486 A1 | 4/2008 | Aoyama et al. | |
| 2009/0144743 A1 | 6/2009 | Wolslegel | |
| 2010/0076933 A1 | 3/2010 | Hamilton et al. | |
| 2010/0082920 A1 | 4/2010 | Larson | |
| 2010/0268788 A1 | 10/2010 | Arimilli et al. | |
| 2011/0246584 A1 | 10/2011 | Vitaldevara et al. | |
| 2011/0321041 A1 | 12/2011 | Bhat et al. | |
| 2012/0042033 A1 | 2/2012 | Ayala et al. | |
| 2012/0102067 A1 | 4/2012 | Cahill et al. | |
| 2012/0173483 A1 | 7/2012 | Hartig et al. | |
| 2012/0174085 A1 | 7/2012 | Driesen et al. | |
| 2012/0233329 A1 | 9/2012 | Dickinson et al. | |
| 2013/0067540 A1* | 3/2013 | Mukkara | H04L 67/1097 726/4 |
| 2013/0085998 A1 | 4/2013 | Barker et al. | |
| 2013/0179883 A1 | 7/2013 | Hayward et al. | |
| 2013/0297800 A1 | 11/2013 | Considine et al. | |
| 2013/0312117 A1 | 11/2013 | Sapp et al. | |
| 2013/0339420 A1 | 12/2013 | Srinivasan et al. | |
| 2013/0346619 A1 | 12/2013 | Panuganty et al. | |
| 2013/0347095 A1* | 12/2013 | Barjatiya | H04L 63/0209 726/13 |
| 2014/0059232 A1 | 2/2014 | Plattner et al. | |
| 2014/0067758 A1 | 3/2014 | Boldyrev et al. | |
| 2014/0067872 A1 | 3/2014 | Kruglick | |
| 2014/0114913 A1 | 4/2014 | Engelko et al. | |
| 2014/0297783 A1 | 10/2014 | Caskey et al. | |
| 2014/0325640 A1 | 10/2014 | Aggarwal et al. | |
| 2015/0020044 A1 | 1/2015 | Venkatesan et al. | |
| 2015/0096011 A1 | 4/2015 | Watt | |
| 2015/0188870 A1 | 7/2015 | Sharp et al. | |
| 2015/0199243 A1 | 7/2015 | Wu et al. | |
| 2016/0026944 A1 | 1/2016 | Gore et al. | |
| 2016/0085772 A1* | 3/2016 | Vermeulen | G06F 16/21 707/615 |
| 2016/0261684 A1* | 9/2016 | Khalaf | H04L 67/1002 |
| 2016/0321274 A1 | 11/2016 | Narayan et al. | |
| 2016/0321276 A1 | 11/2016 | Oliver et al. | |
| 2017/0373995 A1 | 12/2017 | Panchapakesan et al. | |
| 2018/0113585 A1 | 4/2018 | Shah | |
| 2019/0146650 A1 | 5/2019 | Shah | |

FOREIGN PATENT DOCUMENTS

| | | |
|---|---|---|
| WO | 2000026827 A1 | 5/2000 |
| WO | 2006104720 A2 | 10/2006 |
| WO | 2015043679 A1 | 4/2015 |

OTHER PUBLICATIONS

"Non Final Office Action Issued in U.S. Appl. No. 15/333,558", dated Aug. 13, 2018, 30 Pages.

International Search Report and Written Opinion for International Patent Application No. PCT/US2016/029911, dated Aug. 2, 2016, date of filing: Apr. 29, 2016, 11 pages.

Elmore, et al., "Zephyr: Live Migration in Shared Nothing Databases for Elastic Cloud Platforms", In Proceedings of ACM SIGMOD/PODS Conference, Jun. 12, 2011, 12 pages.

"4—Partitioning Multi-Tenant Applications", Published on: Dec. 16, 2012 Available at: https://msdn.microsoft.com/en-us/library/hh534477.aspx.

Ghorbani, et al., "Transparent, Live Migration of a Software-Defined Network", In Proceedings of the ACM Symposium on Cloud Computing, Nov. 3, 2011, 13 pages.

Das, et al., "Live Database Migration for Elasticity in a Multitenant Database for Cloud Platforms", In UCSB Computer Science Technical Report, Sep. 2010, 14 pages.

Michael, et al., "Downtime-Free Live Migration in a Multitenant Database", In Proceedings of 6th TPC Technology Conference on Performance Evaluation & Benchmarking, Sep. 1, 2014, 25 pages.

Barker, et al., "ShuttleDB. Database-Aware Elasticity in the Cloud", In Proceedings of the 11th International Conference on Autonomic Computing, Jun. 17, 2014, 11 pages.

Barkery, et al., ""Cut Me Some Slack": Latency-Aware Live Migration for Databases", In Proceedings of 15th International Conference on Extending Database Technology, Mar. 26, 2012, 12 pages.

Keller, et al., "Live Migration of an Entire Network (and its Hosts)", In Technical Report—TR-926-12, May 2012, 14 pages.

Igbe, Damian, "How to Migrate an Instance with Zero Downtime: OpenStack Live Migration with KVM Hypervisor and NFS Shared Storage", Published on: Oct. 25, 2013 Available at: https://www.mirantis.com/blog/tutorial-openstack-live-migration-with-kvm-hypervisor-and-nfs-shared-storage/.

Kolekar, et al., "Defining a Routing Architecture for 'Multi-Tenant Virtual Data Centers' to support Host Migration", In Final Paper of TLEN 5710—Capstone, Apr. 25, 2014, 26 pages.

Michael, et al., "Database Live Migration with Oracle Multitenant and the Oracle Universal Connection Pool (UCP) on Oracle Real Application Clusters (RAC)", In Oracle White Paper, Oct. 2014, 12 pages.

Second Written Opinion for International Patent Application No. PCT/U2016/029911, dated Nov. 17, 2016, date of filing: Apr. 29, 2016, 6 pages.

"AppZero's Cloud Migration Unlocks Production Apps", Retrieved from https://web.archive.org/web/20150214081345/https://www.appzero.com/cloud. Aug. 14, 2014, 3 Pages.

"Email Activity", Retrieved from https://web.archive.org/web/20160811235448/htps://sendgrid.com/docs/User_Guide/email_activity.html, Aug. 2, 2016, 3 Pages.

"Gmail: Sending, Replying, Attachments and Printing", Retrieved From https://www.wju.edu/its/GoogleAppsTutoriai/GmailBasics.pdf, Jun. 2, 2013, 9 Pages.

"Non-Final Office Action Issued in U.S. Appl. No. 14/854,761", dated Apr. 25, 2018, 17 Pages.

Bergman, et al., "A Personal Email Assistant", In Journal of Software Technology Laboratory, HP Laboratories, Aug. 22, 2002, pp. 1-22.

Bowerman, Guy, "Azure Data Center Migration Just Got Easier", Retrieved From https://azure.microsoft.com/en-in/blog/azure-data-center-migration-just-got-easier/, Jan. 12, 2015, 4 Pages.

Clark, et al., "Live Migration of Virtual Machines", In Proceedings of the 2nd conference on Symposium on Networked Systems Design & Implementation, vol. 2, May 2, 2005, 14 Pages.

Joe, "How to Track and Record Logged in User Activity in Word Press", Retrieved from https://www.designwall.com/blog/track-record-logged-user-activity-wordpress/, Dec. 30, 2014, 6 Pages.

"International Search Report and Written opinion issued in PCT Application No. PCT/US2016/029909", dated Jul. 27, 2016, 11 Pages.

"Second Written Opinion Issued in PCT Application No. PCT/US2016/029909", dated Nov. 17, 2016, 7 Pages.

(56) References Cited

OTHER PUBLICATIONS

"International Preliminary Report on Patentability Issued in PCT Application No. PCT/US2016/029917", dated Feb. 14, 2017, 7 Pages.
"International Search Report and Written opinion issued in PCT Application No. PCT/US2016/029917", dated Jul. 27, 2016, 14 Pages.
"Second Written Opinion Issued in PCT Application No. PCT/US2016/029917", dated Nov. 9, 2016, 6 Pages.
"International Search Report and written Opinion Issued in PCT Application No. PCT/US2017/057064", dated Dec. 13, 2017, 11 Pages.
Reed, David Patrick, "Naming and Synchronization in a Decentralized Computer System", In Publication of Technical Report: Massachusetts Institute of Technology, Department of Electrical Engineering and Computer Science, Sep. 1978, 2 Pages.
Robinson, Melia, "How to Undo a Sent Email in Gmail—Business Insider", Retrieved From https://www.businessinsider.in/Heres-How-To-Undo-A-Sent-Email-In-Gmail/articleshow/26863482.cms, Dec. 4, 2013, 3 Pages.
"Non-Final Office Action Issued in U.S. Appl. No. 16/247,918", dated Apr. 16, 2020, 9 pages.

* cited by examiner

ISOLATING DATA TO BE MOVED ACROSS BOUNDARIES

CROSS-REFERENCE TO RELATED APPLICATION

The present application is based on and claims the benefit of U.S. provisional patent application Ser. No. 62/156,082 filed May 1, 2015, the content of which is hereby incorporated by reference in its entirety.

BACKGROUND

Database systems are currently in wide use. In general, a database system includes a server that interacts with a data storage component to store data (and provide access to it) in a controlled and ordered way.

In one example, a database system includes a plurality of data centers, each having one or more servers. The data centers can be multi-tenant data centers that host data or services or both for a plurality of different tenants. Each tenant can correspond to, for example, a different organization.

The data centers can be disparately located from one another, for instance in different geographic regions. In some scenarios, it may be that data from a first data center is migrated to a second data center.

The discussion above is merely provided for general background information and is not intended to be used as an aid in determining the scope of the disclosed subject matter.

SUMMARY

Data to be moved from a source system to a target system, for a set of tenants, is first identified. It is then isolated into its own container. The contents are then moved.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
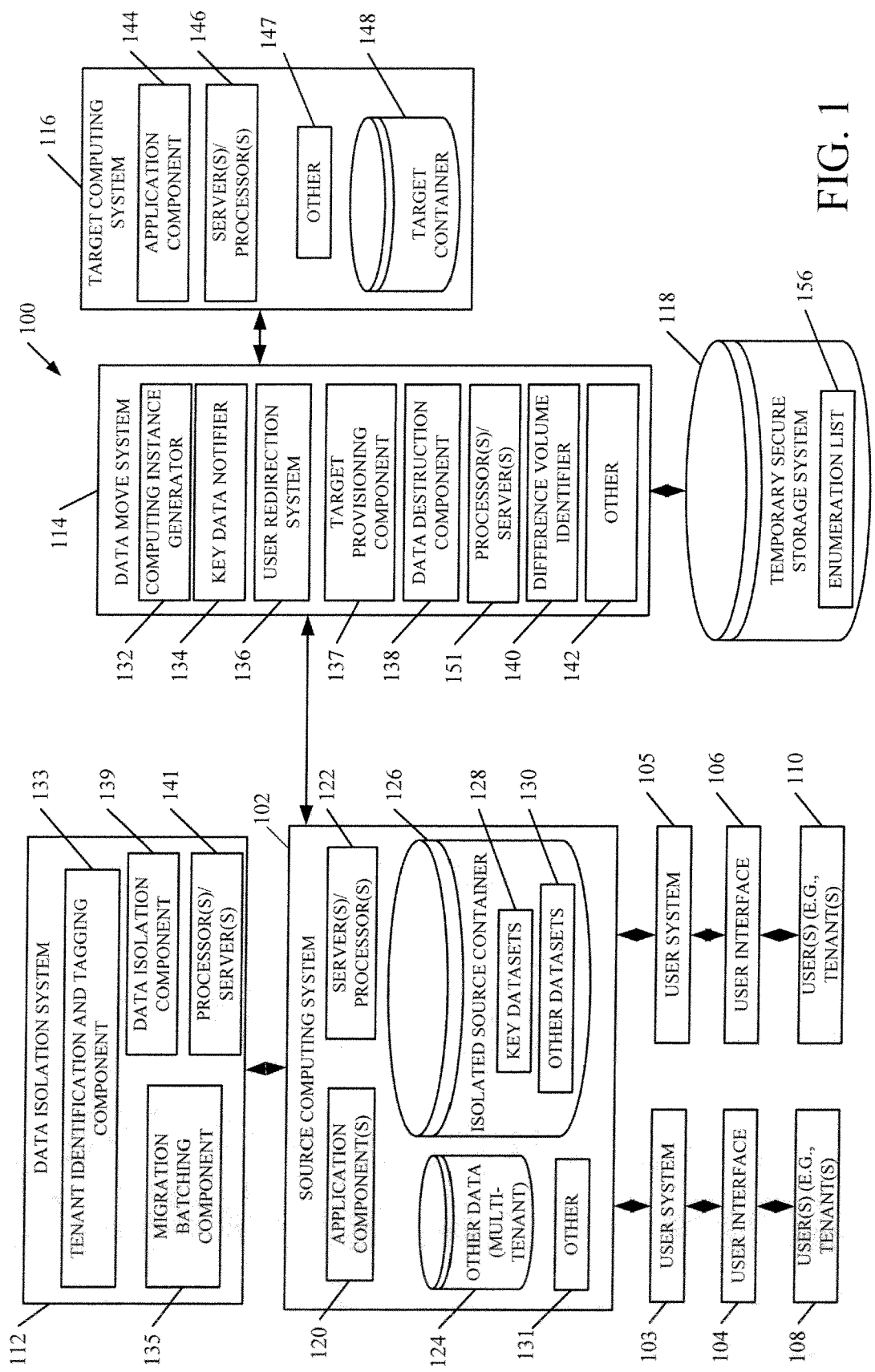
FIG. 1 is a block diagram of one example of a data storage architecture.

FIG. 1 is a block diagram of various components of one illustrative data storage architecture 100. Data storage architecture 100 illustratively includes a source computing system 102 that interacts with user computing systems 103 and 105 to generate user interface displays 104-106 with user input mechanisms for interaction by users 108-110 (who may be tenants in a multi-tenant system, for instance). Users 108-110 interact with the user input mechanisms to control and manipulate system 102.

Architecture 100 can also include data isolation system 112, data move system 114 and target computing system 116, along with temporary secure storage system 118. Source computing system 102 illustratively includes application component 120, servers or processors 122, multi-tenant data in data store 124 and data to be moved in source container 126. It can include other items 131 as well. The data to be moved is illustratively data that is isolated from data in store 124 and can be broken into key datasets 128 and other (or non-essential) datasets 130. Data isolation system 112 illustratively includes tenant identification and tagging component 133, migration batching component 135, data isolation component 139 and processors or servers 141. Data move system 114 illustratively includes computing instance generator 132, key data notifier 134, user redirection system 136, target provisioning component 137, data destruction system 138, servers or processors 151, difference volume identifier 140, and it can include other items 142 as well. Target computing system 116 illustratively includes application component 144, servers or processors 146, target container 148 and it can include other items 147 as well.

By way of overview, application components 120 and 144 illustratively run applications or services on systems 102 and 116, respectively. When tenant data (or any portion of data) is to be transferred from source system 102 to target system 116, data isolation system 112 isolates that data into source container 126. It can also identify key datasets 128 based on their metadata, their frequency of use, or based on a wide variety of other criteria. Data move system 114 provisions the tenants to be moved to target system 116 and begins to move the data from source container 126 to target container 148. When the key datasets 128 have been successfully moved, key data notifier 134 notifies redirection component 136, which redirects users 108-110 the users (or tenants) of the data being moved) to be serviced by target computing system 116 and target container 148. Any user requests for other datasets 130 are illustratively redirected back to source computing system 102, until those datasets are moved as well, at which point data destruction component destroys the data in source container 126. These operations will now be described in more detail.

Figure 2:
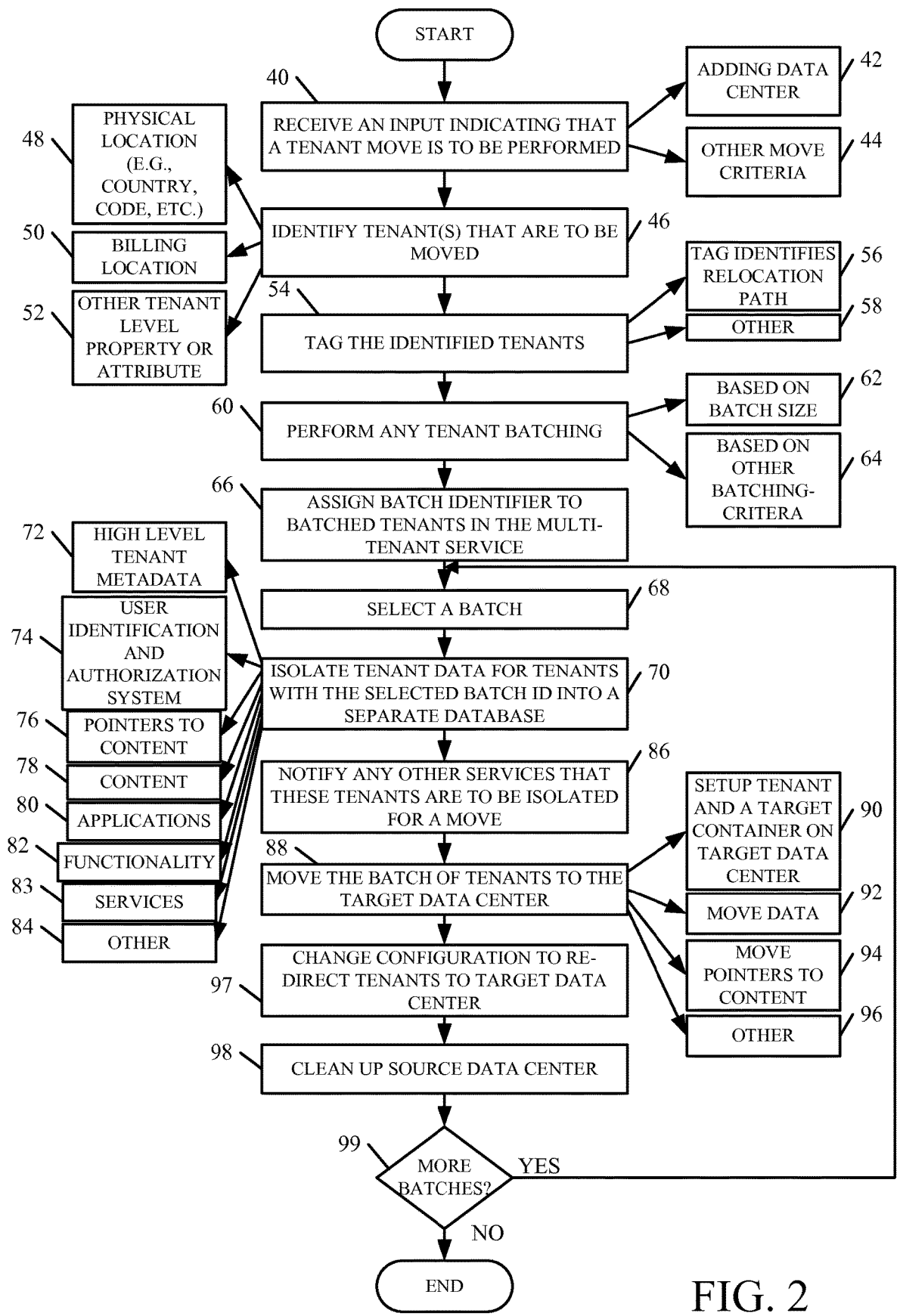
FIG. 2 is a flow diagram of one example of the operation of architecture 100 in isolating data and moving data from a source data center to a target data center.

FIG. 2 is a flow diagram illustrating one example of the operation of the architecture shown in FIG. 1 in isolating data to be moved from source computing system 102 to target computing system 116. In one example, data move system 114 first receives an input indicating that a tenant move is to be performed. This is indicated by block 40 in FIG. 2.

There may be a wide variety of different reasons that a given user or tenant, or a given set of users or tenants, are to have their data (which can include data, metadata, content, applications, services, etc.) moved from one data center to another. For instance, when a new data center is added, it may be that, for load rebalancing purposes, a set of tenants are to be moved to the data center. In another example, where a data center is added in a new geographic location, it may be that a group of tenants will be moved to that data center because they are physically located closer to it. Tenant data may be migrated because of data sovereignty laws, or for a wide variety of other reasons as well. Adding a data center is indicated by block 42 in FIG. 2, and moving for other reasons is indicated by block 44.

Data isolation system 112, and in particular tenant identification and tagging component 133, then identifies tenants that are to be moved. This is indicated by block 46 in FIG. 2. For instance, component 133 can identify tenants based upon their physical location (such as a country code that identifies the country where they reside). This is indicated by block 48. Component 132 can identify tenants based upon their billing location, as indicated by block 50, or based on a wide variety of other tenant-level property or attribute values. This is indicated by block 52.

Once the tenants are identified based upon the given criteria, component 132 tags the identified tenants with a unique tag. This is indicated by block 54 in FIG. 2. The tag can identify the particular relocation path for the tenant (such as indicating that the tagged tenant is to move from source computing system 102 to target computing system 116). This is indicated by block 56. The tag can include a wide variety of other information as well, or different information, as indicated by block 58.

Migration batching component 135 then performs any tenant batching that may be used by architecture 100. This is indicated by block 60. For example, where a relatively large number of tenants are to be moved, the batches may be formed based upon desired batch size. This is indicated by block 62. The batch size may be set to enhance the experience of the tenants or other end users that are being moved. By way of example, if the batch is very large, this may result in a less favorable user experience. However, if the batch is relatively small, this may result in the user experience being uninterrupted (or nearly uninterrupted). The batches can be generated on a variety of other batching criteria as well, and this is indicated by block 64.

Once the batches are identified, migration batching component 135 assigns a batch identifier to each of the tenants in the multi-tenant service, that are to be migrated. This is indicated by block 66.

Data isolation component 139 then selects a batch ID and isolates tenant data for tenants with the selected batch ID, into a separate database (such as isolated source container 126). Selecting a batch ID is indicated by block 68 in FIG. 2, and isolating the tenant data based on the selected batch ID is indicated by block 70.

It should be noted that the tenant data can take a wide variety of different forms. For instance, it can be generally high level tenant metadata 72, such as metadata that identifies the tenant, characteristics of the tenant, etc. It can also be user identification and authorization data (such as roles, permissions, or a wide variety of other information for the various users in a tenant). This is indicated by block 74. In some cases, the actual content (such as documents or other content) may be stored on a different data store. In that case, the tenant data can include pointers to the content in that other data store. This indicated by block 76. The data can also include the content itself, as indicated by block 78, and various applications 80, functionality 82, services 83, or other information, data, services, etc. 84 that are hosted for a given tenant.

It may be that the identified tenants use other services as well, in architecture 100. In that case, tenant identification and tagging component 133 can also notify any other services that the given tenants are to be isolated for a move. This is indicated by block 86.

Data move system 114 then begins to move the batch of tenants to the target data center. This is indicated by block 88. In one example, target provisioning component 137 provisions (or otherwise sets up) the tenant, and a target container for the tenant, on the target data center. This is indicated by block 90.

System 114 then moves the data, and any pointers to content, for the tenant. Moving the data is indicated by block 92 and moving the pointers to content is indicated by block 94. System 114 can move other data or move data in other ways as well, and this is indicated by block 96. Moving the data is described in greater detail below with respect to FIGS. 2A and 2B.

User redirection system 136 then changes the computing system configuration to re-direct tenants to the target data center, once their data has been moved. This is indicated by block 97 in FIG. 2 and is described in greater detail below with respect to FIG. 3.

Data destruction component 138 then cleans up the source data center (or source computing system) 102 by deleting the data, once it has been moved. This is indicated by block 98.

Data move system 114 then determines whether there are any more batches of tenants to be moved. If so, processing reverts to block 68. Determining whether any additional batches are to be moved is indicated by block 99 in FIG. 2.

Figure 2A:
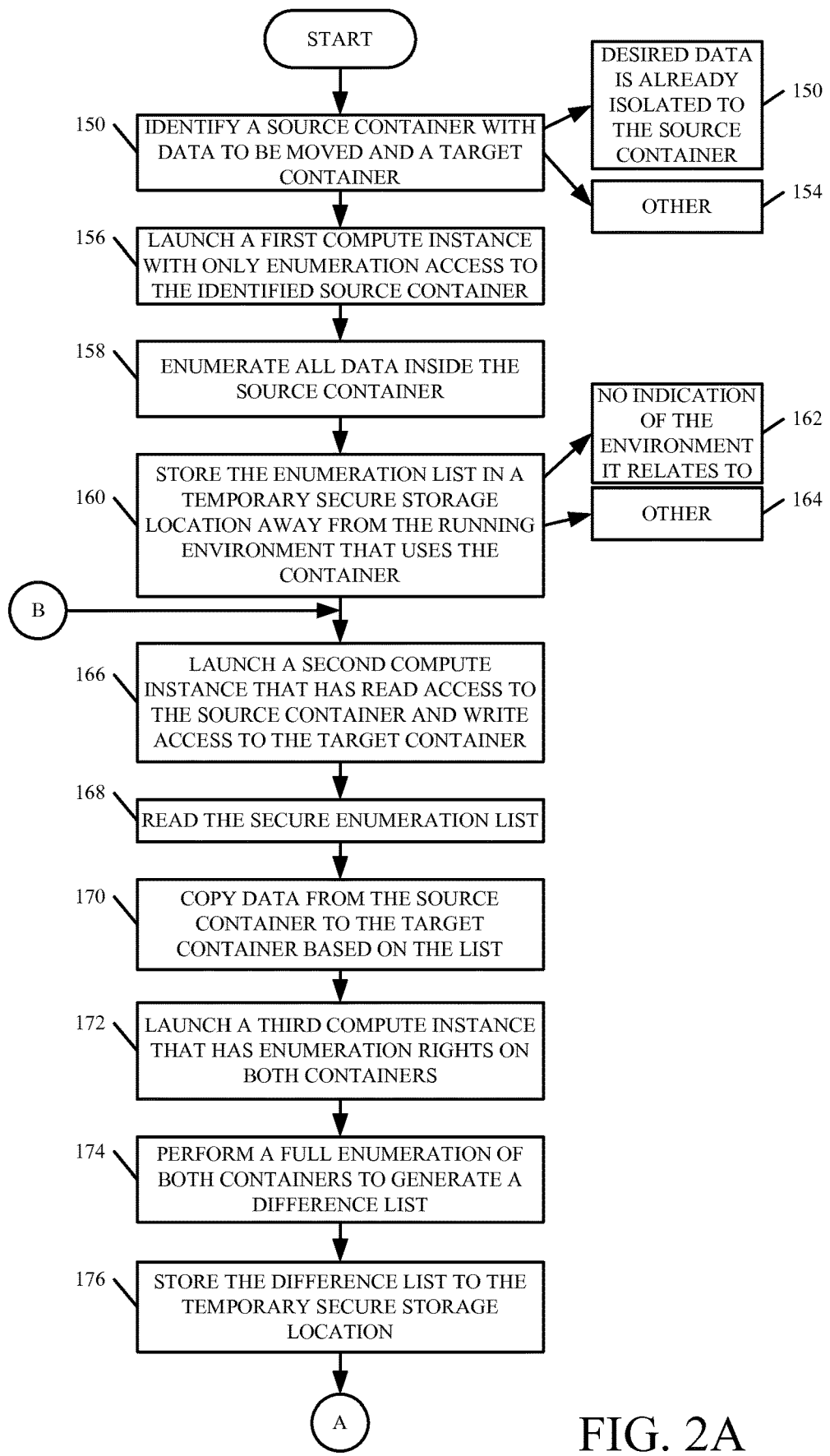
FIGS. 2A and 2B show a flow diagram illustrating one example of the operation of the architecture shown in FIG. 1 in moving data from a source container to a target container, in more detail.
Figure 2B:
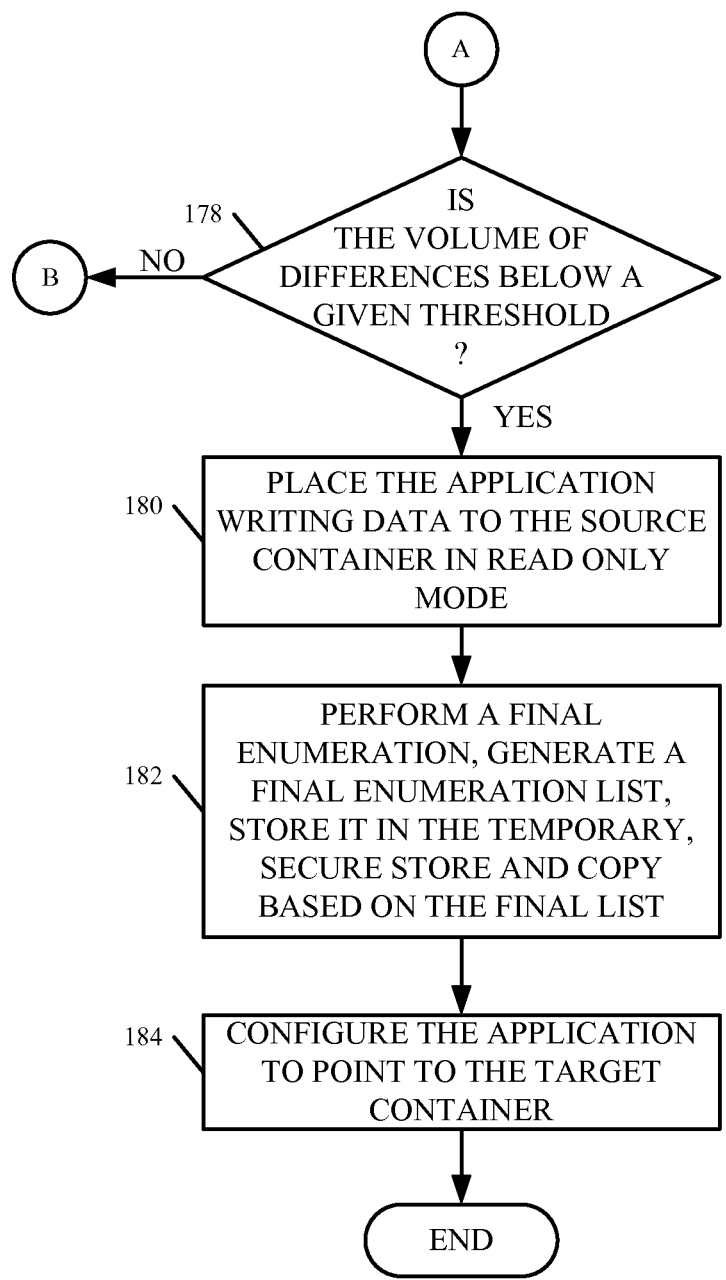

FIGS. 2A and 2B show a flow diagram illustrating the operation of architecture 100 in moving data, and ensuring that all the data has been moved from the source container to the target container. Data move system 114 first identifies the source and target containers 126 and 148. This is indicated by block 150. It is assumed that data isolation system 112 has already identified the data to be moved and isolated it into its own data container (or its own set of data containers) 126, which has no other tenant data (or other data that is not to be moved to system 116) in it. This is indicated by block 152. This can be done in other ways as well, as indicated by block 154.

Computing instance generator 132 then launches a first computing system instance that only has enumeration rights to source container 126. The first instance then enumerates all data inside container 126 and generates an enumeration list 156. Launching the first computing instance and enumerating the contents of source container 126 is indicated by blocks 156 and 158, respectively.

The list is stored in temporary secure storage system 118. System 118 is illustratively in a physically separate location from source computing system 102, as indicated by block 160. The enumeration list 156 illustratively has no indication that it relates to the environment of source computing system 102. It can be made in other ways as well. This is indicated by blocks 162 and 164.

Once the enumeration list is stored in storage system 118, computing instance generator 132 launches a second computing system instance that has read access to source container 126 and write access to target container 148. This is indicated by block 166. It reads the secure enumeration list 156 and copies data from the source container 126 to the target container 148 based on the enumeration list. This is indicated by blocks 168 and 170.

Computing instance generator 132 then generates a third computing instance that has enumeration access to both source container 126 and target container 148. It performs a full enumeration of both containers and compares them to generate a difference list, which now becomes the new enumeration list of items to be moved. The difference list will illustratively represent changes made to the tenant data in data container 126, since the secure enumeration list 156 was created. Launching the third computing instance, performing the full enumeration and storing the difference list in the secure store is indicated by blocks 172, 174 and 176, respectively.

Difference volume identifier 140 then determines whether the volume of the differences (e.g., the number or size of items in the difference enumeration list) meets a given threshold. This is indicated by block 178. If not, processing reverts to block 166 where the migration continues without interrupting the operation of source container 126, with respect to its users 108-110.

The threshold is illustratively set low enough that the subsequent migration of the remaining data will last for a sufficiently short time that the source container 126 can be placed in read only mode, without a significant, negative impact on users 108-110 of the source container. If the volume of differences meets the threshold, then source container 126 is placed in read only mode so that no further changes can be made to it. Placing it in read only mode is indicated by block 180.

A computing instance performs a final enumeration of the source and target containers 126 and 148 to identify a final enumeration list, and a final copy of data is performed from source container 126 to target container 148, based on the final enumeration list. This is indicated by block 182. The application is then configured to point the users 108-110 of the data that was moved to target container 148, and subsequent user requests are serviced by target computing system 116 and target container 148. This is indicated by block 184.

Figure 3:
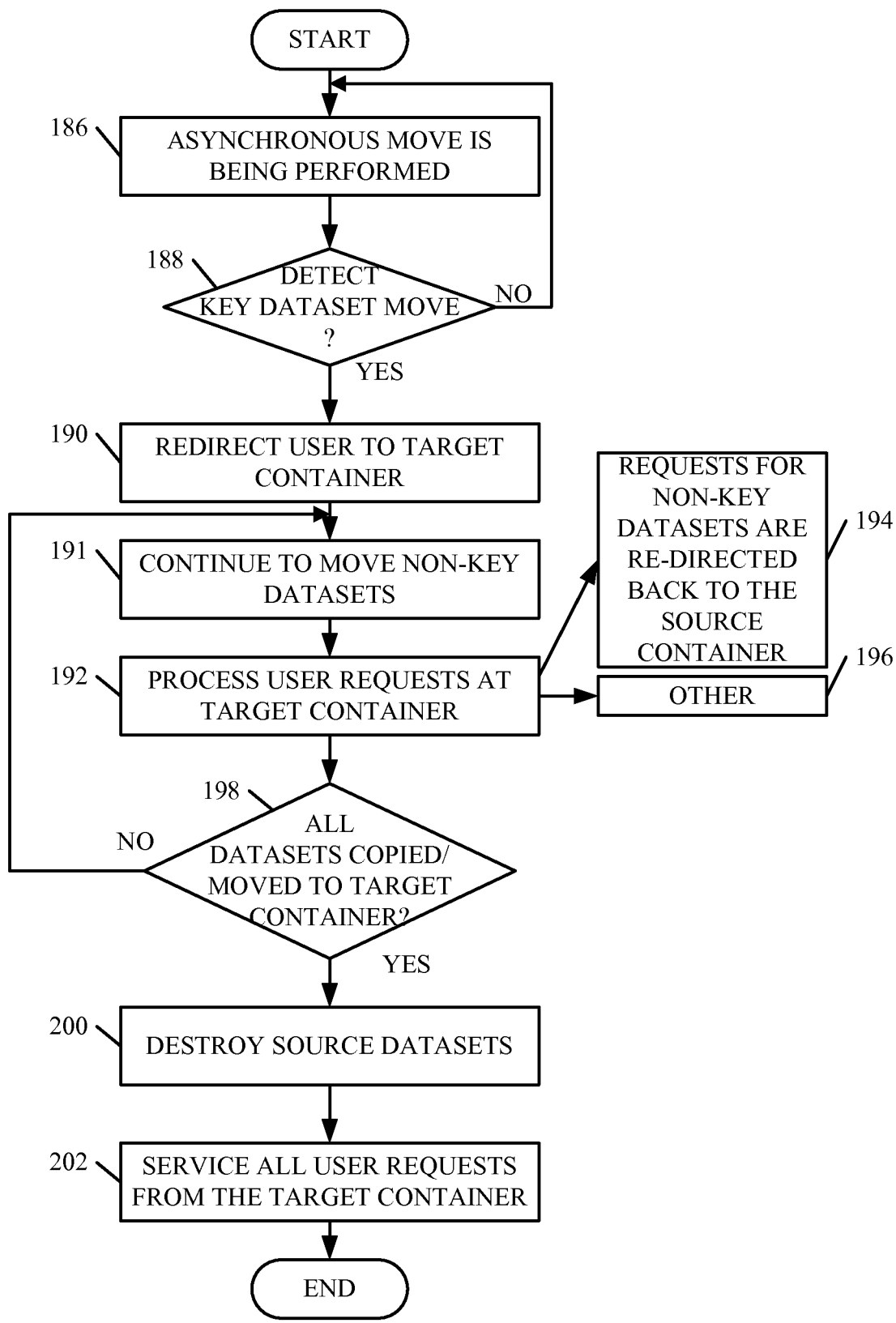
FIG. 3 is a flow diagram showing one example of the operation of the architecture shown in FIG. 1 redirecting users (or tenants) from the source data center to the target data center.

FIG. 3 is a flow diagram illustrating another example of the operation of data move system 114 in moving data and redirecting users. It is first assumed in FIG. 3 that an asynchronous move is being performed as discussed above. This is indicated by block 186. In one example, when data is being moved as discussed above with respect to FIGS. 2A and 2B the computing instances enumerate the key datasets 128 and identify them as such. Thus, during movement of the data, the key datasets can be preferentially moved before the other datasets 130. As mentioned above, the key datasets may be the datasets that are accessed by users to perform core functions. The key datasets can be other datasets or identified in other ways as well. They can be datasets most frequently or most recently accessed by users. They can be various portions of the tenant metadata, applications, services, functionality, content, etc.

As soon as all the key datasets 128 are moved, key data notifier 134 notifies the user redirection system 136, and user redirection system 136 redirects the users 108-110 of the data in source container 126 to target computing system 116 and target container 148. This is indicated by blocks 188 and 190 in FIG. 3. Data move system 114 continues to move non-key datasets from source container 126 to target container 148. This is indicated by block 191.

Once the key datasets are moved (even while the non-key datasets are still being moved), target system 116 processes user requests from target container 148. This is indicated by block 192.

In one example, users 108-110 may request other datasets 130, which have not yet been moved to target container 148. In such cases, user redirection system 136 redirects those requests back to source computing system 102 and source container 126. This is indicated by block 194. The user requests can be processed in other ways as well. This is indicated by block 196.

When all datasets (both key datasets and non-key datasets) are copied to target container 148, data destruction component destroys the source datasets in source container 126. This is indicated by blocks 198 and 200.

After that point, all user requests are serviced from target computing system 116 and target container 148. This is indicated by block 202.

It can thus be seen that the tenant being moved has very little disruption. There is a relatively short time window when the tenants data will be read only. Also, the data is transferred in a highly secure manner Separation of computing instances with limited access rights greatly enhances security. Also, by initially isolating data of tenants to be moved into its own containers, efficiencies achieved by moving an entire container can be achieved as well.

The present discussion mentions a variety of different components. It will be noted that the components can be consolidated so that more functionality is performed by each components, or they can be divided so that the functionality is further distributed.

It should also be noted that the above discussion has shown one or more data stores. Each data store can be any of a wide variety of different types of data stores. Further, the data in the data store can be stored in multiple additional data stores as well. Also, the data stores can be local to the environments, agents, modules, and/or components that access them, or they can be remote therefrom and accessible by those environments, agents, modules, and/or components. Similarly, some can be local while others are remote.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 4:
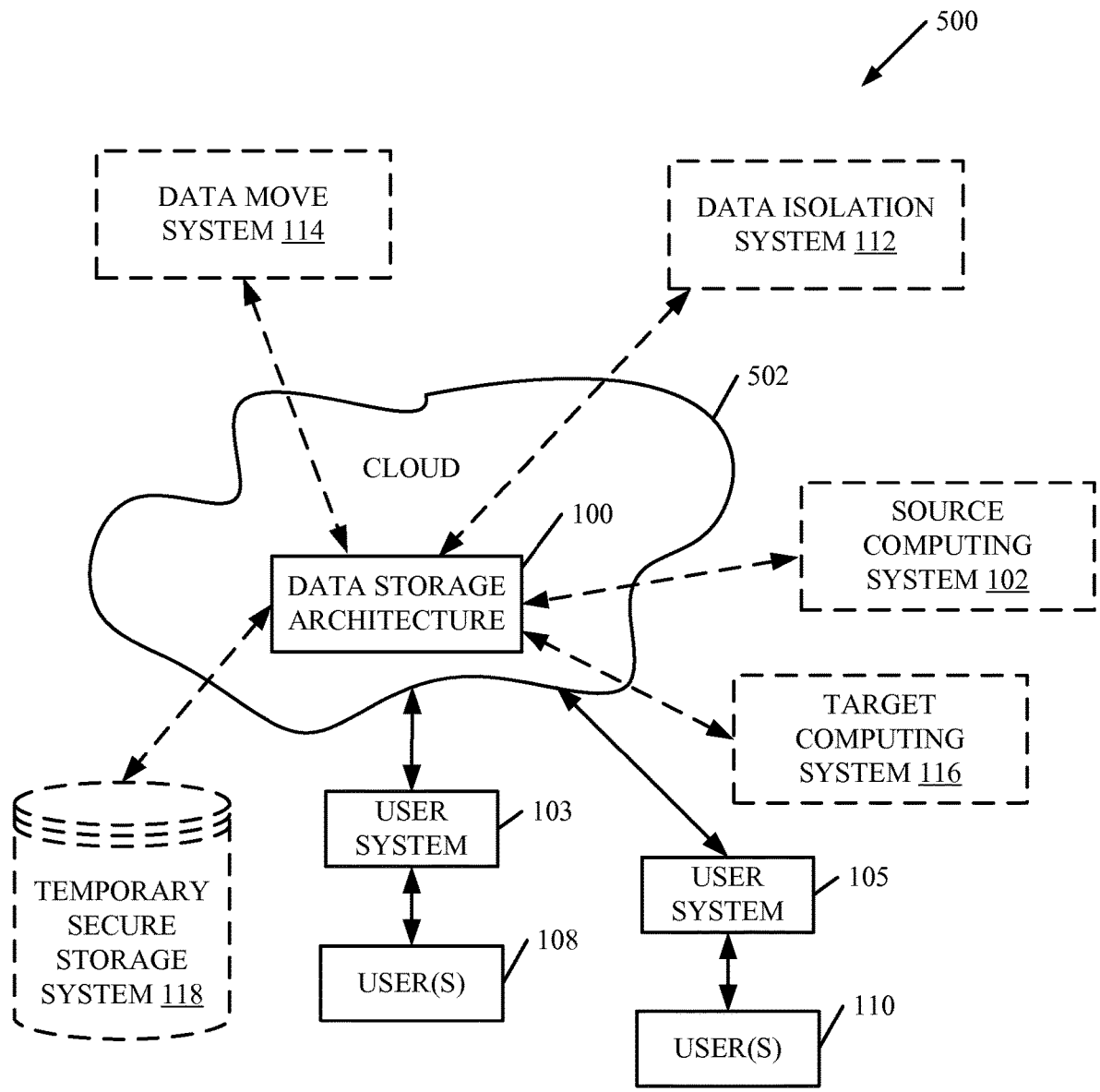
FIG. 4 shows an example of a cloud computing architecture.

FIG. 4 is a block diagram of a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of computing architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 4, some items are similar to those shown in FIG. 1 and they are similarly numbered. FIG. 4 specifically shows that some or all components of architecture 100 can be located in cloud 502 (which can be public, private, or a combination where portions are public while others are private). Therefore, users 108 and/or 110 use user systems 103, 105 to access those components through cloud 502.

FIG. 4 also depicts another example of a cloud architecture. FIG. 4 shows that it is also contemplated that some elements of architecture 100 can be disposed in cloud 502 while others are not. For example, system 102 can be disposed outside of cloud 502, and accessed through cloud 502. In another example, system 116 can be disposed outside of cloud 502, and accessed through cloud 502. In another example, system 114 can be disposed outside of cloud 502, and accessed through cloud 502. In another example, system 118 can be disposed outside of cloud 502, and accessed through cloud 502. Regardless of where they are located, they can be accessed directly by systems 103-105, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 5:
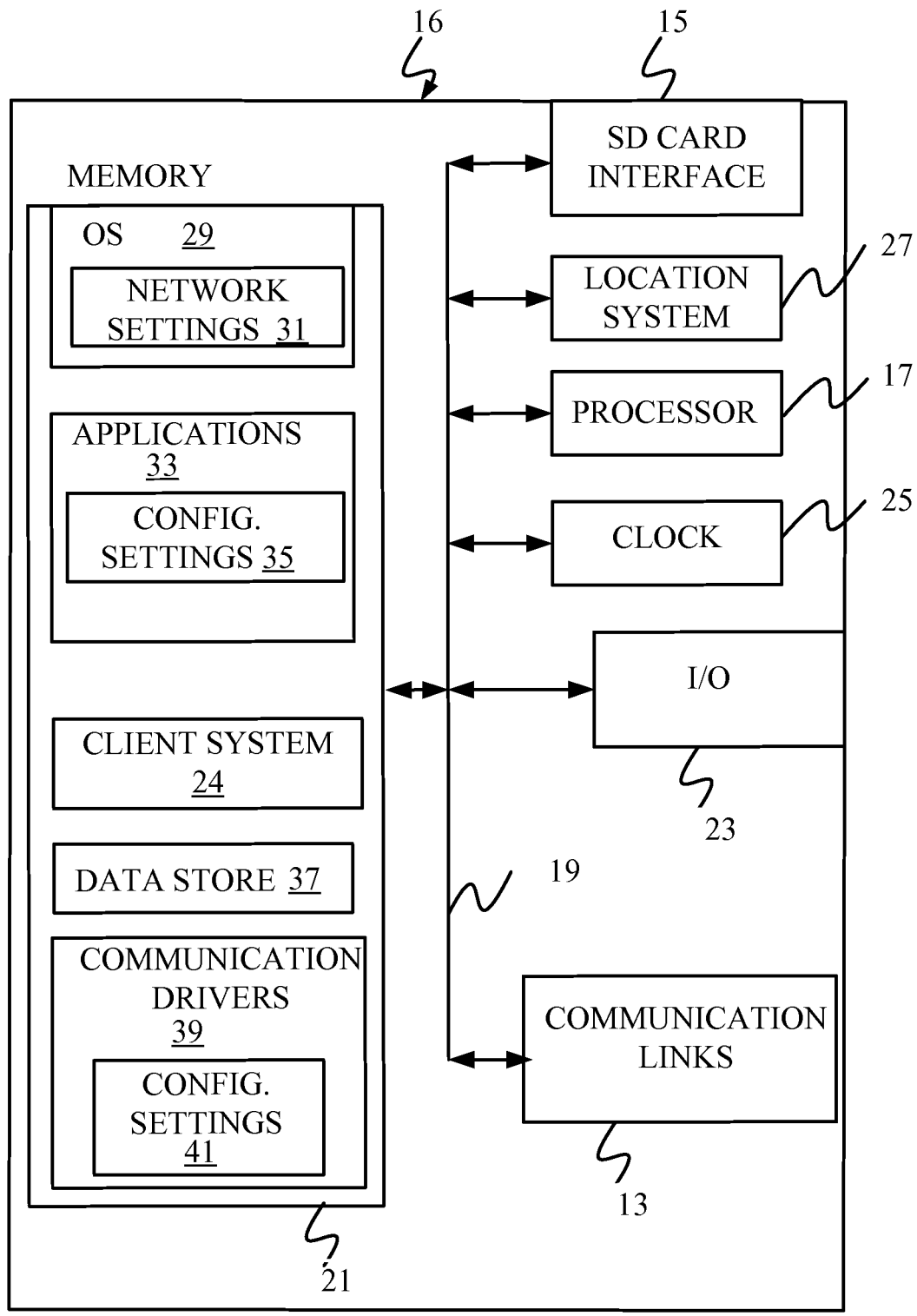
FIGS. 5-7 show examples of mobile devices that can be used in any of the architectures shown in previous figures.
Figure 6:
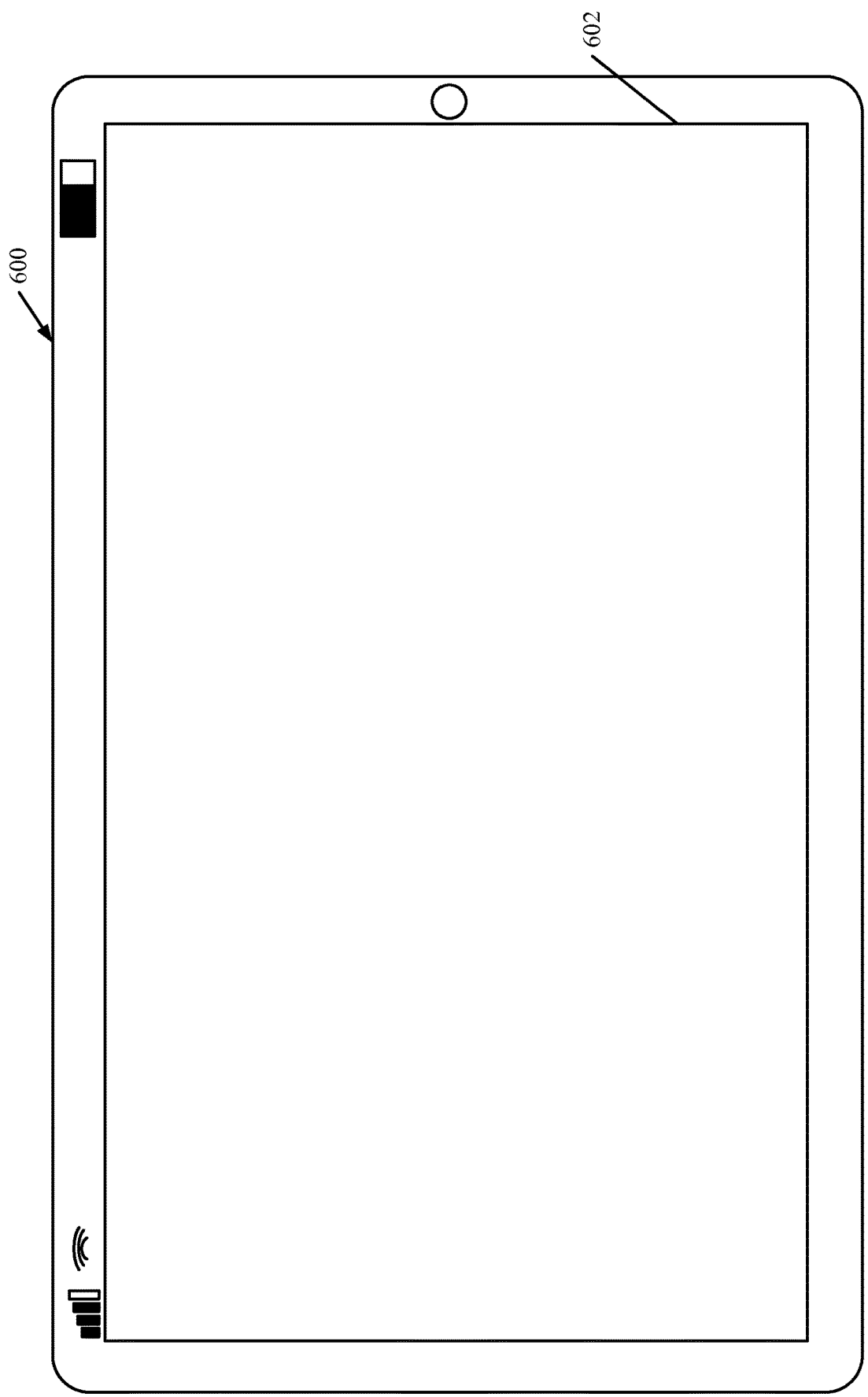
Figure 7:
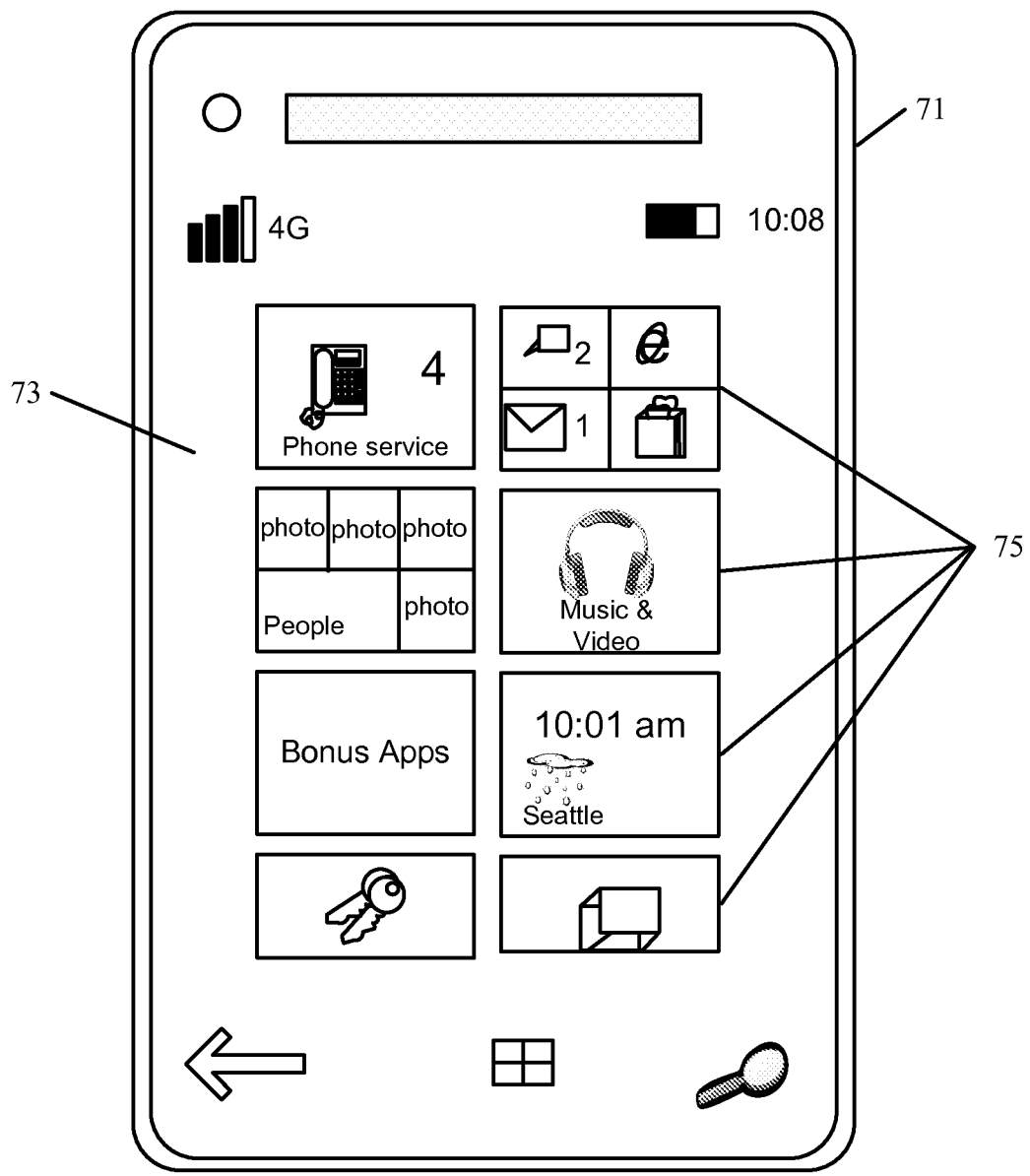

FIG. 5 is a simplified block diagram of one illustrative example of a handheld or mobile computing device that can be used as a user's or client's hand held device 16, in which the present system (or parts of it) can be deployed. FIGS. 6-7 are examples of handheld or mobile devices.

FIG. 5 provides a general block diagram of the components of a client device 16 that can run components of architecture 100 or that interacts with architecture 100, or both. In the device 16, a communications link 13 is provided that allows the handheld device to communicate with other computing devices and under some embodiments provides a channel for receiving information automatically, such as by scanning Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as 802.11 and 802.11b (Wi-Fi) protocols, and Bluetooth protocol, which provide local wireless connections to networks.

Under other embodiments, applications or systems are received on a removable Secure Digital (SD) card that is connected to a SD card interface 15. SD card interface 15 and communication links 13 communicate with a processor 17 along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various client applications or client-side applications. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 6 shows one example in which device 16 is a tablet computer 600. In FIG. 6, computer 600 is shown with user interface display displayed on the display screen 602. Screen 602 can be a touch screen (so touch gestures from a user's finger 604 can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Additional examples of devices 16 can be used, as well. Device 16 can be a feature phone, smart phone or mobile phone. The phone includes a set of keypads for dialing phone numbers, a display capable of displaying images including application images, icons, web pages, photographs, and video, and control buttons for selecting items shown on the display. The phone includes an antenna for receiving cellular phone signals such as General Packet Radio Service (GPRS) and 1Xrtt, and Short Message Service (SMS) signals. In some embodiments, phone also includes a Secure Digital (SD) card slot that accepts a SD card.

The mobile device can be personal digital assistant (PDA) or a multimedia player or a tablet computing device, etc. (hereinafter referred to as a PDA). The PDA can include an inductive screen that senses the position of a stylus (or other pointers, such as a user's finger) when the stylus is positioned over the screen. This allows the user to select, highlight, and move items on the screen as well as draw and write. The PDA also includes a number of user input keys or buttons which allow the user to scroll through menu options or other display options which are displayed on the display, and allow the user to change applications or select user input functions, without contacting the display. Although not shown, The PDA can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections. In one embodiment, mobile device also includes a SD card slot that accepts a SD card.

FIG. 7 shows that the phone can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 8:
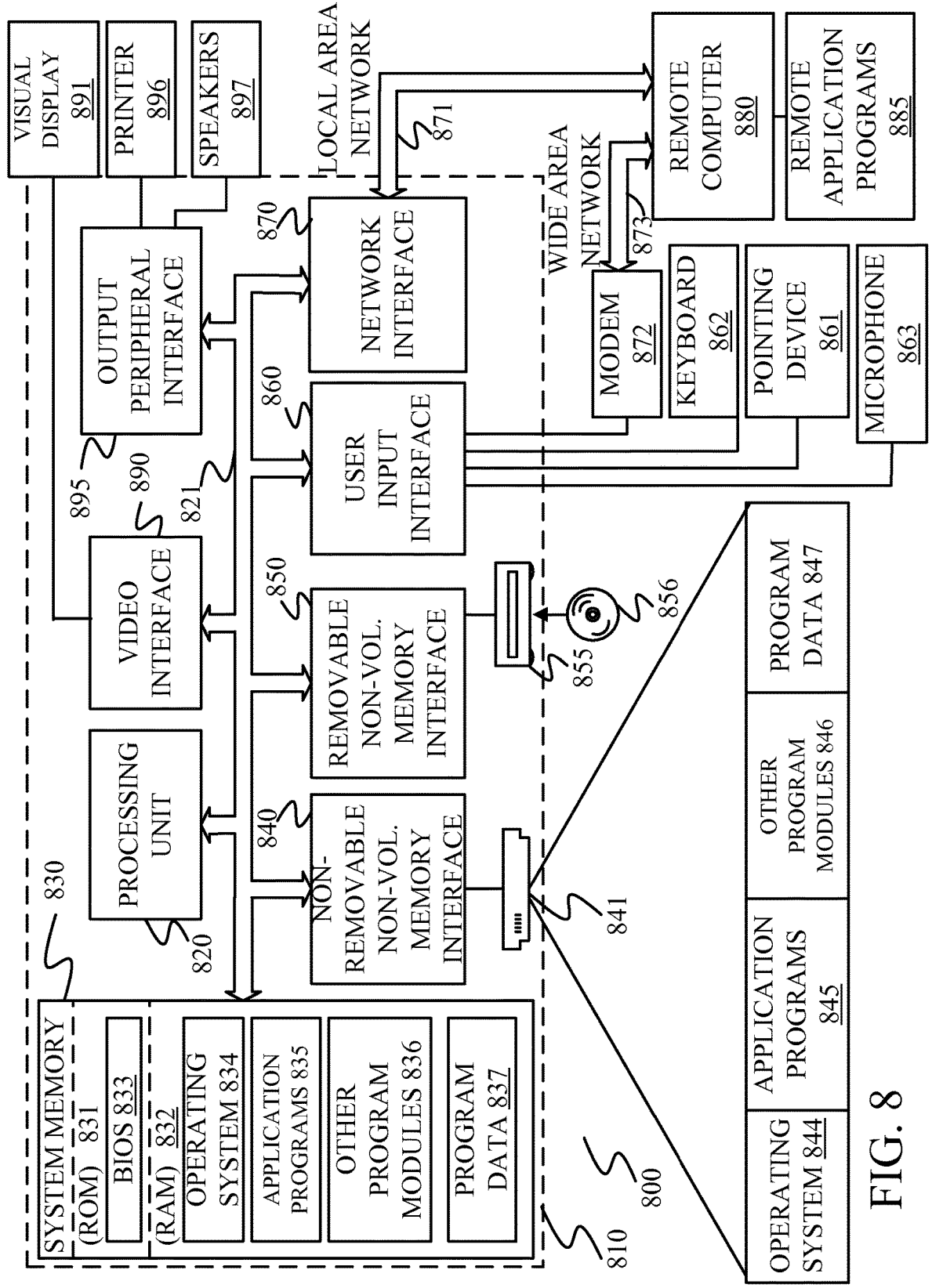
FIG. 8 is a block diagram of a computing environment that can be used in any of the architectures shown in the previous figures.

FIG. 8 is one example of a computing environment in which architecture 100, or parts of it, (for example) can be deployed. With reference to FIG. 8, an example system for implementing some embodiments includes a general-purpose computing device in the form of a computer 810. Components of computer 810 may include, but are not limited to, a processing unit 820 (which can be any processors or servers in the previous Figures), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 8.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable volatile/nonvolatile computer storage media. By way of example only, FIG. 8 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 8, provide storage of computer readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 8 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 8 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:
a tenant identification component configured to identify a set of tenants in a source computing system that have data to be moved to a target computing system;
a data isolation component configured to isolate the data for the set of tenants into an isolated source container database that is isolated from other multi-tenant data in the source computing system; and
a data move system configured to move the data from the isolated source container database to a target container in the target computing system.

Example 2 is the computing system of any or all previous examples wherein the tenant identification component identifies a tenant-level attribute of each tenant in the source computing system and determines whether each tenant should be identified as a tenant in the set of tenants that have data to be moved, based on the tenant-level attribute.

Example 3 is the computing system of any or all previous examples wherein the tenant identification component identifies a geographical location attribute of each tenant, as the tenant-level attribute.

Example 4 is the computing system of any or all previous examples and further comprising:
a tenant tagging component configured to tag tenants in the set of tenants with an identifier tag that has a relocation path indicator that identifies the source computing system that stores data for the given tenant and the target computing system that the data for the given tenant is to be relocated to.

Example 5 is the computing system of any or all previous examples wherein the data isolation component is configured to identify data to be moved as data for the tenants that are tagged with the identifier tags and move the data to be moved into the isolated source container database.

Example 6 is the computing system of any or all previous examples wherein the data isolation system comprises:
a migration batching component that batches tenants in the set of tenants into batches, the data move system moving the data to the target computing system based on the batches.

Example 7 is the computing system of any or all previous examples wherein the migration batching component is configured to batch the tenants by assigning a batch identifier to each tenant in the set of tenants, based on a set of batching criteria.

Example 8 is the computing system of any or all previous examples wherein data move system selects a batch identifier and moves data for all tenants with the selected batch identifier from the isolated source container database to the target container.

Example 9 is a computer implemented method of moving data from a source computing system to a target computing system, comprising:
identifying a set of tenants of the source computing system that have data to be moved to the target computing system;

isolating the data for the set of tenants into an isolated source container database that is isolated from other multi-tenant data in the source computing system; and moving the data from the isolated source container database to a target container in the target computing system.

Example 10 is the computer-implemented method of any or all previous examples wherein identifying the set of tenants comprises:

identifying a tenant-level attribute of each tenant; and determining whether each tenant should be identified as a tenant in the set of tenants that have data to be moved, based on the tenant-level attribute.

Example 11 is the computer implemented method of any or all previous examples wherein identifying a tenant-level attribute comprises:

identifying a geographical location attribute of each tenant.

Example 12 is the computer implemented method of any or all previous examples wherein identifying a set of tenants comprises:

tagging tenants in the set of tenants with an identifier tag.

Example 13 is the computer implemented method of any or all previous examples wherein tagging tenants comprises:

tagging each given tenant with a relocation path indicator that identifies the source computing system that stores data for the given tenant and the target computing system that the data for the given tenant is to be relocated to.

Example 14 is the computer implemented method of any or all previous examples wherein isolating the data for the set of tenants comprises:

identifying data to be moved as data for the tenants that are tagged with the identifier tags; and moving the data to be moved into the isolated source container database.

Example 15 is the computer implemented method of any or all previous examples wherein moving the data from the isolated source container database to the target container comprises:

batching tenants in the set of tenants into batches; and moving the data based on the batches.

Example 16 is the computer implemented method of any or all previous examples wherein batching tenants comprises:

assigning a batch identifier to each tenant in the set of tenants, based on a set of batching criteria.

Example 17 is the computer implemented method of any or all previous examples wherein moving the data based on the batches comprises:

selecting a batch identifier; and moving data for all tenants with the selected batch identifier from the isolated source container database to the target container.

Example 18 is a computing system, comprising:

a tenant identification and tagging component configured to determine whether each tenant in a source computing system should be identified as a tenant in a set of tenants that have data to be moved to a target computing system, based on a tenant-level attribute of each tenant in the source computing system and to tag tenants in the set of tenants with an identifier tag that has a relocation path indicator that identifies the source computing system that stores data for the given tenant and the target computing system that the data for the given tenant is to be relocated to; and a data isolation component configured to isolate the data for the set of tenants into an isolated source container, that is isolated from other multi-tenant data in the source computing system.

Example 19 is the computing system of any or all previous examples and further comprising:

a migration batching component that batches tenants in the set of tenants into batches and to assign a batch identifier to each tenant in the set of tenants, based on a set of batching criteria.

Example 20 is the computing system of any or all previous examples and further comprising:

a data move system configured to select a batch identifier and move data for all tenants with the selected batch identifier from the isolated source container database to the target container.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other equivalent features and acts are intended to be within the scope of the claims.

What is claimed is:

1. A computing system comprising:
at least one processor; and
memory storing instructions executable by the at least one processor, wherein the instructions, when executed, cause the computing system to:
identify a plurality of tenants in a source computing system that each have data corresponding to a move operation to move the data from the source computing system to a target computing system;
assign a batch identifier to each tenant, in the plurality of tenants, based on a batching criterion; and
perform the move operation by
batching the tenants into a set of batches based on the batch identifiers, and
for each batch in the set of batches, isolate the data for the tenants in the batch into an isolated source container database that is isolated from other multi-tenant data in the source computing system, and move the isolated data from the isolated source container database to a target container in the target computing system.

2. The computing system of claim 1 wherein the instructions cause the computing system to identify a tenant-level attribute of each tenant in the source computing system and to select the plurality of tenants to move to the target computing system based on the tenant-level attributes.

3. The computing system of claim 2 wherein the tenant-level attribute comprises a geographical location attribute, assigned to each particular tenant, that indicates a geographic location corresponding to the particular tenant.

4. The computing system of claim 1 wherein the instructions cause the computing system to:
tag each particular tenant, in the plurality of tenants, with an identifier tag that has a relocation path indicator that identifies:
the source computing system that stores data for the particular tenant, and
the target computing system corresponding to the move operation.

5. The computing system of claim 4 wherein the instructions cause the computing system to identify data corresponding to the move operation as data for the tenants that are tagged with the identifier tags and move the data into the isolated source container database.

6. The computing system of claim 2 wherein the plurality of tenants include some, but not all, of the tenants in the source computing system.

7. The computing system of claim 1 wherein
the batching criterion comprises a batch size criterion, and
the instructions cause the computing system to perform the move operation for each batch by selecting a particular one of the batch identifiers and isolating the data for all tenants with the selected batch identifier into a separate isolated source container.

8. The computing system of claim 7 wherein the separate isolated source container for each batch comprises a separate database.

9. A computer-implemented method of moving data from a source computing system to a target computing system, the computer-implemented comprising:
tagging each tenant, in a plurality of tenants, with an identifier tag that identifies that the tenant has data, in the source computing system, that corresponds to a move operation to move the data to the target computing system;
assigning a batch identifier to each tenant, in the plurality of tenants, based on a batching criterion; and
performing the move operation by
batching the tenants into a set of batches based on the batch identifiers, and
for each batch in the set of batches, isolating the data for the tenants in the batch into an isolated source container database that is isolated from other multi-tenant data in the source computing system, and moving the isolated data from the isolated source container database to a target container in the target computing system.

10. The computer-implemented method of claim 9, and further comprising:
identifying a tenant-level attribute of each tenant; and
determining whether each tenant should be identified as a tenant in the plurality of tenants that have data corresponding to the move operation, based on the tenant-level attribute.

11. The computer implemented method of claim 10 wherein identifying a tenant-level attribute comprises:
identifying a geographical location attribute, of each tenant, that indicates a geographic location corresponding to the tenant.

12. The computer implemented method of claim 10 wherein tagging tenants comprises:
tagging each given tenant with a relocation path indicator that identifies:
the source computing system that stores data for the given tenant, and
the target computing system corresponding to the move operation.

13. The computer implemented method of claim 10 wherein the plurality of tenants include some, but not all, of the tenants in the source computing system.

14. The computer implemented method of claim 1, wherein the batching criterion comprises a batch size criterion, and moving the isolated data comprises performing the move operation for each batch by selecting a particular one of the batch identifiers and isolating the data for all tenants with the selected batch identifier into a separate isolated source container.

15. The computer implemented method of claim 14 wherein the separate isolated source container for each batch comprises a separate database.

16. A computing system, comprising:
at least one processor; and
memory storing instructions executable by the at least one processor, wherein the instructions, when executed, provide:
a tenant identification and tagging component configured to:
identify, for each tenant in a source computing system, a tenant-level geographic attribute that indicates a geographic location corresponding to the tenant;
select a set of the tenants in the source computing system to move to a target computing system based on the tenant-level geographic attributes;
tag each particular tenant, in the set of tenants, with an identifier tag that has a relocation path indicator that identifies the source computing system that stores data for the particular tenant and the target computing system that the data for the particular tenant is to be relocated to; and
a data isolation component configured to isolate the data for the set of tenants into an isolated source container, that is isolated from other multi-tenant data in the source computing system.

17. The computing system of claim 16, wherein the instructions provide:
a migration batching component configured to batch tenants in the set of tenants into batches and to assign a batch identifier to each tenant in the set of tenants, based on a set of batching criteria.

18. The computing system of claim 17, wherein the instructions provide:
a data move system configured to select a batch identifier and move data for all tenants with the selected batch identifier from the isolated source container database to the target container.

* * * * *